US012340936B2

(12) United States Patent
Urabe et al.

(10) Patent No.: US 12,340,936 B2
(45) Date of Patent: Jun. 24, 2025

(54) COIL COMPONENT AND METHOD FOR MAKING COIL COMPONENT

(71) Applicant: TDK CORPORATION, Tokyo (JP)

(72) Inventors: Junichiro Urabe, Tokyo (JP); Hajime Kato, Tokyo (JP); Toshinori Matsuura, Tokyo (JP); Kazuya Tobita, Tokyo (JP); Yuto Shiga, Tokyo (JP); Yuichi Takubo, Tokyo (JP); Youichi Kazuta, Tokyo (JP); Noriaki Hamachi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 666 days.

(21) Appl. No.: 17/690,489

(22) Filed: Mar. 9, 2022

(65) Prior Publication Data

US 2022/0293333 A1 Sep. 15, 2022

(30) Foreign Application Priority Data

Mar. 11, 2021 (JP) ................................ 2021-039375

(51) Int. Cl.

| | |
|---|---|
| ***H01F 27/29*** | (2006.01) |
| ***H01F 17/04*** | (2006.01) |
| ***H01F 27/28*** | (2006.01) |
| ***H01F 41/10*** | (2006.01) |

(52) U.S. Cl.

CPC ......... *H01F 27/292* (2013.01); *H01F 17/045* (2013.01); *H01F 27/2823* (2013.01); *H01F 41/10* (2013.01); *H01F 2017/048* (2013.01)

(58) Field of Classification Search

CPC .. H01F 27/292; H01F 17/045; H01F 27/2823; H01F 41/10; H01F 2017/048

See application file for complete search history.

(56) References Cited

U.S. PATENT DOCUMENTS

| | | | | |
|---|---|---|---|---|
| 6,784,782 | B2 * | 8/2004 | Inoue | H01F 41/0246 336/200 |
| 11,309,117 | B2 * | 4/2022 | Xia | H01F 27/28 |
| 2009/0085703 | A1 * | 4/2009 | Liu | H01F 17/04 29/602.1 |
| 2009/0128275 | A1 * | 5/2009 | Yagasaki | H01F 17/04 336/83 |
| 2010/0253463 | A1 * | 10/2010 | Shimomura | H01F 41/0246 336/200 |
| 2011/0006870 | A1 * | 1/2011 | Sakamoto | H01F 17/045 336/221 |
| 2011/0175698 | A1 * | 7/2011 | Duh | H01F 27/366 336/212 |

(Continued)

FOREIGN PATENT DOCUMENTS

JP 2015070154 A * 4/2015

*Primary Examiner* — Malcolm Barnes

(74) *Attorney, Agent, or Firm* — Oliff PLC

(57) ABSTRACT

A coil component includes an exterior body, a coil, and a pair of terminal electrodes. The coil is disposed inside the exterior body. The pair of terminal electrodes are electrically connected to the coil and are disposed on the exterior body. The exterior body includes a first portion that covers the coil and is made of a resin, and a second portion including a side surface on which the pair of terminal electrodes are disposed. The second portion includes a material having a relative permittivity lower than a relative permittivity of the resin and is disposed between the coil and the pair of terminal electrodes.

7 Claims, 16 Drawing Sheets

(56) References Cited

U.S. PATENT DOCUMENTS

| | | | | |
|---|---|---|---|---|
| 2013/0143381 | A1* | 6/2013 | Kikukawa | H01F 41/041 336/200 |
| 2016/0307694 | A1* | 10/2016 | Ohtsubo | H01F 17/04 |
| 2017/0053739 | A1* | 2/2017 | Oki | H01F 41/04 |
| 2019/0027287 | A1* | 1/2019 | Kudo | H01F 27/29 |
| 2020/0075222 | A1* | 3/2020 | Ogasawara | H01F 17/045 |
| 2020/0075226 | A1* | 3/2020 | Ogasawara | H01F 27/24 |

* cited by examiner

COIL COMPONENT AND METHOD FOR MAKING COIL COMPONENT

TECHNICAL FIELD

The present disclosure relates to a coil component and a method for making a coil component.

BACKGROUND

Known coil components include a coil configured of a wire, a core portion around which the wire is wound, a resin member that covers substantially the entire coil and core portion, and terminal electrodes that are electrically connected to the coil and disposed on a side surface of the resin member (see, for example, Japanese Unexamined Patent Publication No. 2015-70154).

SUMMARY

In the conventional coil components described above, stray capacitance is generated by the coil and the terminal electrodes opposing each other. This stray capacitance may affect characteristics of the coil component. For example, the stray capacitance causes a decrease in self-resonant frequency in the coil component. Thus, a technique for inhibiting a decrease in self-resonant frequency is desired.

An object of one aspect of the present invention is to provide a coil component in which a decrease in self-resonant frequency is inhibited. An object of other aspect of the present invention is to provide a method for making a coil component in which a decrease in self-resonant frequency is inhibited.

A coil component according to one aspect of the present invention includes an exterior body, a coil, and a pair of terminal electrodes. The coil is disposed inside the exterior body. The pair of terminal electrodes are electrically connected to the coil and are disposed on the exterior body. The exterior body includes a first portion that covers the coil and is made of a resin, and a second portion on which the pair of terminal electrodes are disposed. The second portion includes a material having a relative permittivity lower than a relative permittivity of the resin and is disposed between the coil and the pair of terminal electrodes.

In this coil component, the second portion including a low permittivity material having a relative permittivity lower than a relative permittivity of the resin of the first portion is disposed between the coil and the terminal electrodes. Therefore, stray capacitance generated between the coil and the terminal electrodes is reduced by the low permittivity material of the second portion, and a decrease in self-resonant frequency in the coil component is inhibited.

In the above one aspect, the coil may include a wire. The wire may include a first wire portion having a spiral shape and a pair of second wire portions. Each of the pair of second wire portions may be continuous with a corresponding terminal electrode of the pair of terminal electrodes. Each of the terminal electrodes may have a flat plate shape.

For example, in a case in which a physical impact is applied to the coil component, electrical connection between the terminal electrodes and the coil may be broken. In the configuration in which the terminal electrodes and the second wire portions of the wire are continuous with each other, the electrical connection between the terminal electrodes and the coil tends not to be broken even in the case in which a physical impact is applied to the coil component.

The configuration in which each of the terminal electrodes has a flat plate shape easily realizes electrical connection between the terminal electrodes and another electronic component when the coil component is mounted on the electronic component.

In the above one aspect, the second portion may include a flat side surface on which the pair of terminal electrodes are disposed. Each of the second wire portions may include an inner portion disposed inside the exterior body, and an outer portion disposed on the exterior body and continuous with the corresponding terminal electrode. The inner portion may extend in a direction intersecting the side surface, and the outer portion may extend in a direction along the side surface.

In this case, the coil covered with the exterior body and the terminal electrodes disposed on the exterior body are more reliably connected to each other by the second wire portions.

In the above one aspect, the wire may include a conductor and a coating layer covering the conductor and having electrical insulation.

In this case, since the conductor of the wire is protected by the coating layer, the conductor tends not to be damaged even in a case in which the wire is bent.

In the above one aspect, the coil component may further include a core portion located inside the coil. The core portion may be made of a resin.

A method for making a coil component according to other aspect includes preparing a coil, forming an exterior body to cover the coil, and disposing a pair of terminal electrodes electrically connected to the coil on the exterior body. The forming step includes forming a first portion covering the coil with a resin, and forming a second portion on which the pair of terminal electrodes are to be disposed with a predetermined material. The disposing step includes disposing the pair of terminal electrodes on the exterior body such that the second portion is disposed between the coil and the pair of terminal electrodes. The predetermined material has a relative permittivity lower than a relative permittivity of the resin.

In the above other aspect, the second portion is formed between the coil and the terminal electrodes with a low permittivity material having the relative permittivity lower than a relative permittivity of the resin of the first portion. Therefore, stray capacitance generated between the coil and the terminal electrodes is reduced by the low permittivity material of the second portion, and a decrease in self-resonant frequency in the coil component is inhibited.

In the above other aspect, the preparing step may include preparing the coil made of a wire. The method may further include forming the pair of terminal electrodes continuous with the wire through pressing both end portions of the wire before the disposing step.

In this case, connecting the terminal electrodes to the coil is unnecessary in the making process of the coil component, and thus the making process is facilitated.

The wire and the terminal electrodes are continuous with each other, and thus electrical connection between the terminal electrodes and the coil tends not to be broken even in a case in which a physical impact is applied to the coil component.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

DETAILED DESCRIPTION

Figure 1:
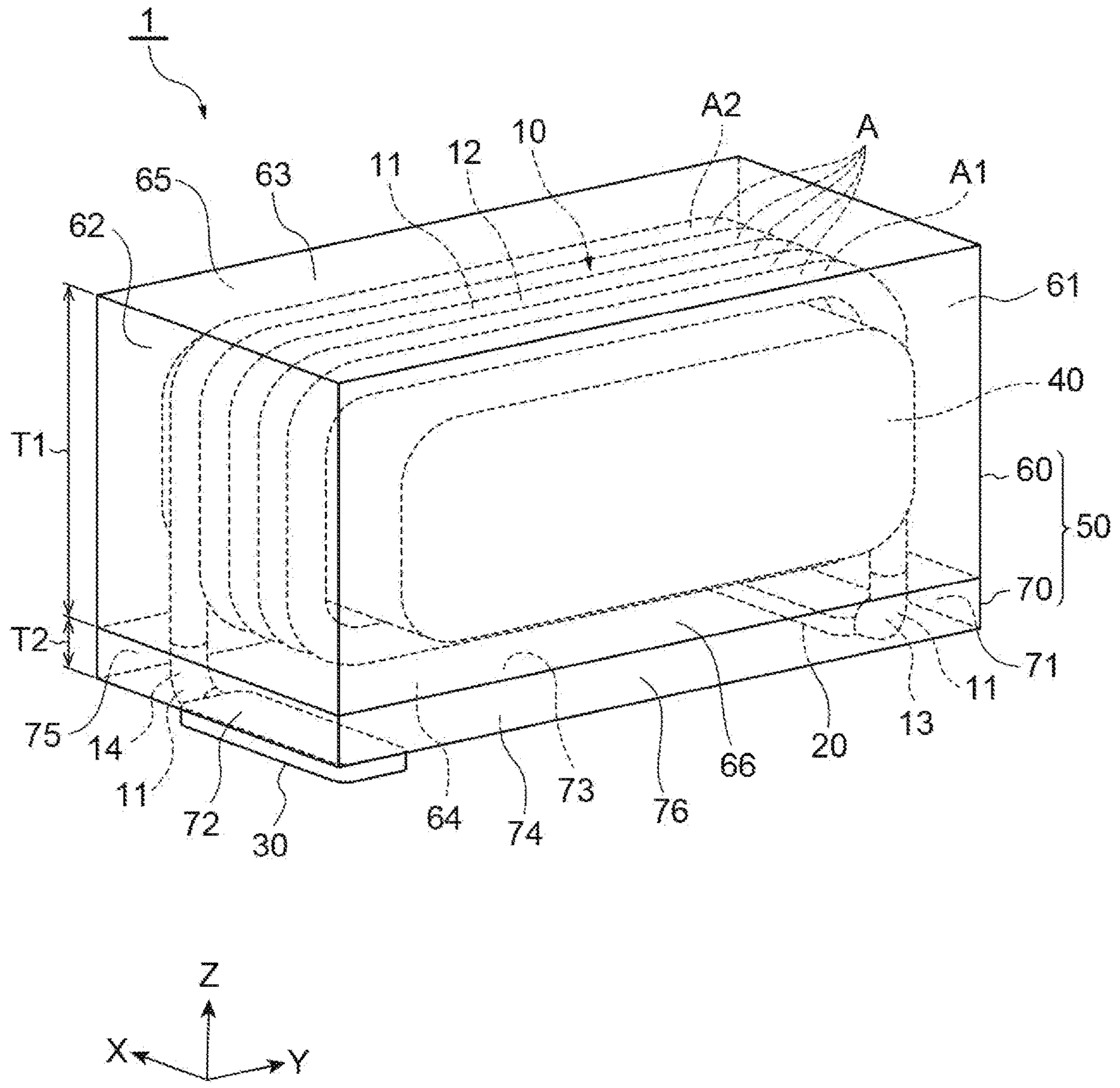
FIG. 1 is a perspective view illustrating a coil component according to a first embodiment.

Hereinafter, embodiments of the present invention will be described in detail with reference to the accompanying drawings. In the following description, the same elements or elements having the same functions are denoted with the same reference numerals and overlapped explanation is omitted.

First Embodiment

Figure 2:
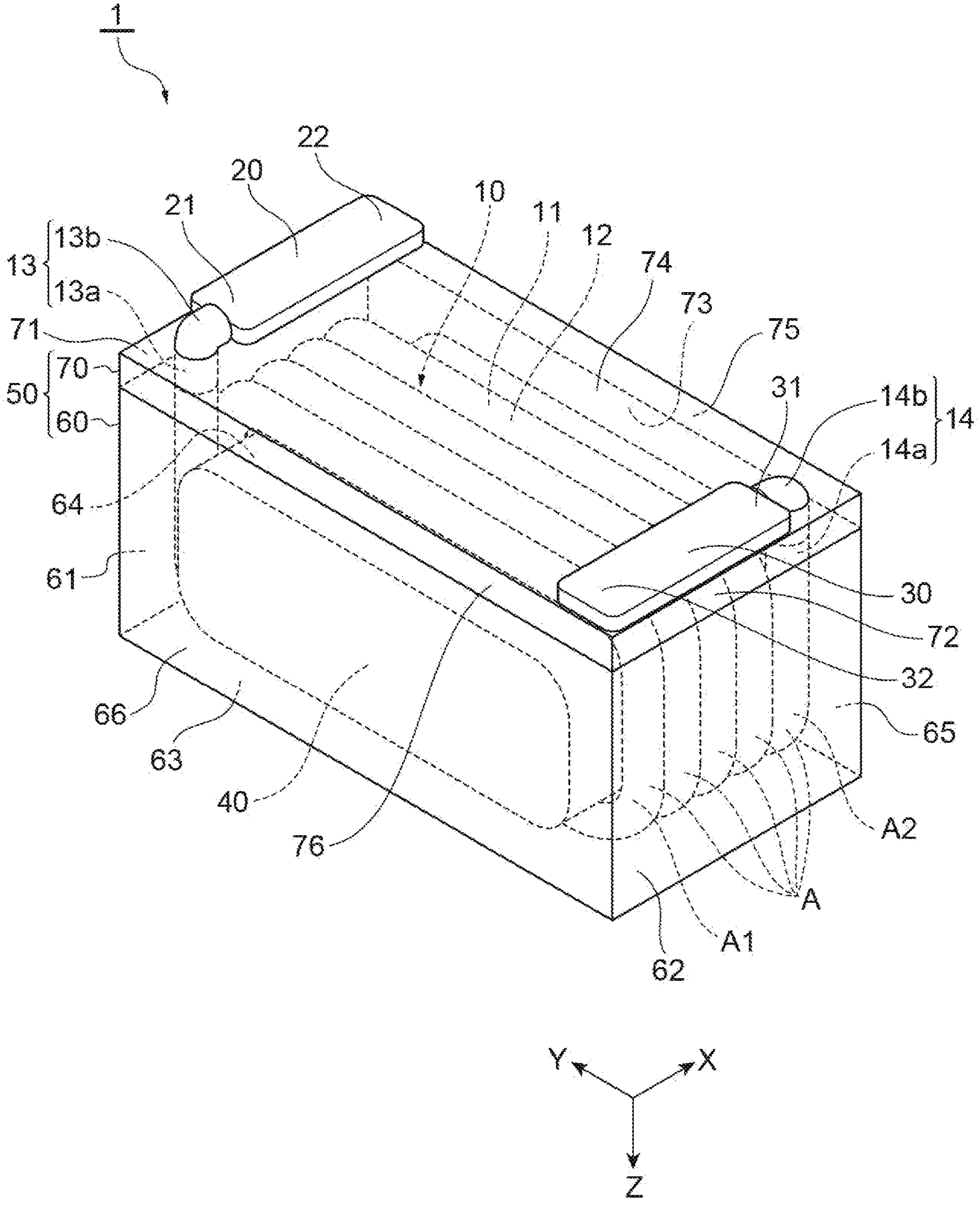
FIG. 2 is a perspective view illustrating the coil component according to the first embodiment from a side surface side of a second portion on which terminal electrodes are disposed.
Figure 3:
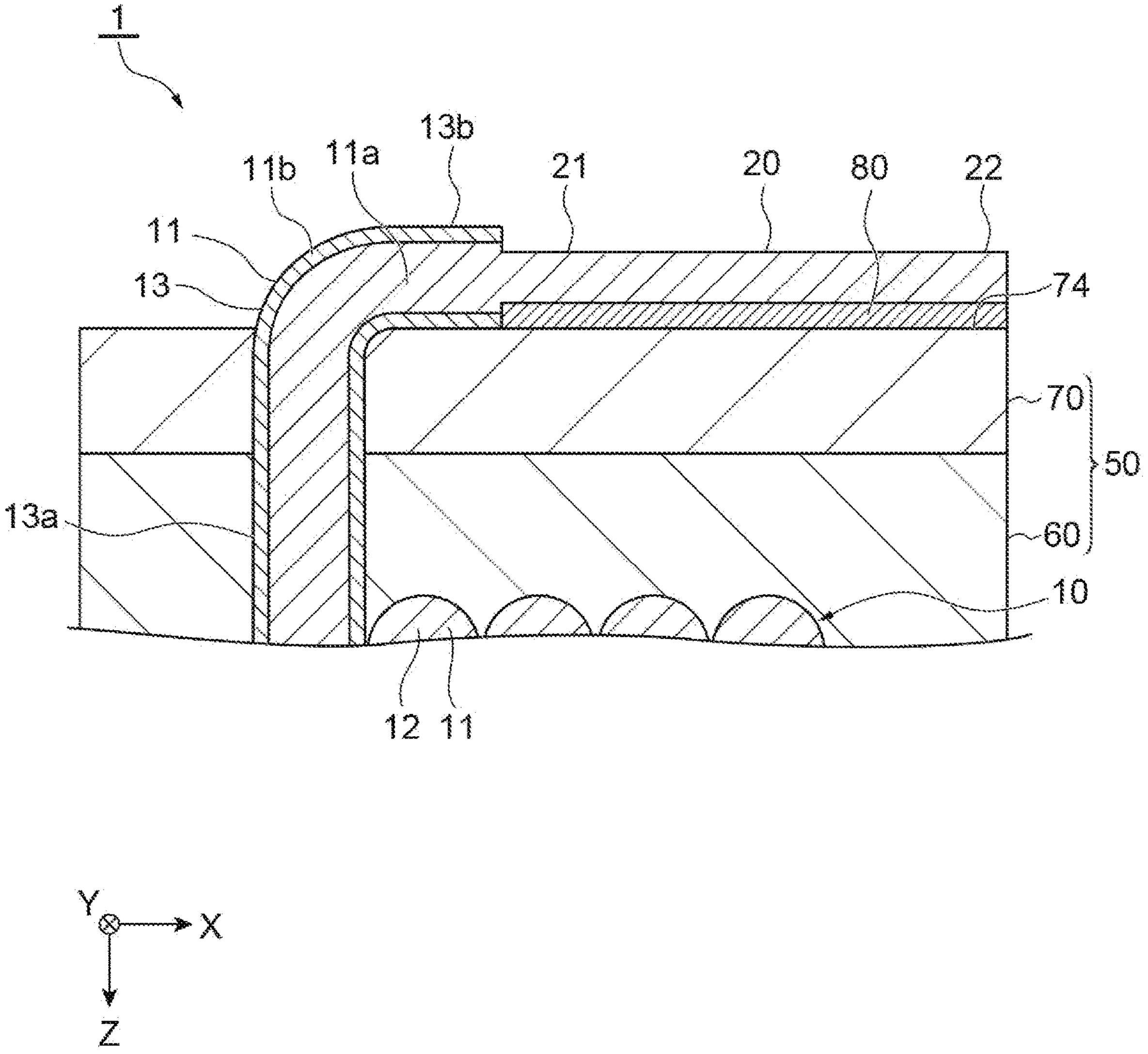
FIG. 3 is a cross-sectional view of a connection portion of a wire and a terminal electrode.

A configuration of a coil component 1 according to a first embodiment will be described with reference to FIGS. 1 to 3. FIG. 1 is a perspective view illustrating the coil component 1 according to the present embodiment. FIG. 2 is a perspective view illustrating the coil component 1 according to the present embodiment from a side surface 74 side of a second portion 70 on which terminal electrodes 20 and 30 are disposed. FIG. 3 is a cross-sectional view of a connection portion 13 of a wire 11 and the terminal electrode 20. The coil component 1 includes a coil 10, a pair of terminal electrodes 20 and 30, a core portion 40, and an exterior body 50.

The coil 10 includes the wire 11. The wire 11 includes a portion 12 having a spiral shape. Hereinafter, the portion 12 of the wire 11 is referred to as a coil portion 12. The coil portion 12 is disposed on an outer side of the core portion 40. In the following description, an axial direction of the coil 10 is a direction X, a direction intersecting the direction X is a direction Y, and a direction intersecting the direction X and the direction Y is a direction Z. In the present embodiment, the directions X, Y and Z are orthogonal to each other.

The wire 11 includes a pair of connection portions 13 and 14. The pair of connection portions 13 and 14 are continuous with both ends of the coil portion 12, and electrically connect the coil 10 and the pair of terminal electrodes 20 and 30. For example, when the coil portion 12 is a first wire portion, the connection portions 13 and 14 are second wire portions.

The coil portion 12 includes a plurality of turns A. That is, the coil 10 includes the plurality of turns A. The plurality of turns A are arranged in the direction X. A region defined by each turn A has a rectangular shape in which the corners are rounded when viewed in the direction X. A shape of each turn A may be an annular shape. Turns A1 and A2 located at both ends of the plurality of turns A in the direction X are connected respectively to the terminal electrodes 20 and 30 via the connection portions 13 and 14.

As illustrated in FIG. 3, the wire 11 includes a conductor 11*a* and a coating layer 11*b* covering the conductor 11*a*. The conductor 11*a* may be made of a conductive metal material. Metal materials include copper, silver, nickel, or chromium. The coating layer 11*b* may be made of a material having electrical insulation. Materials having electrical insulation include polyurethane. In the connection portions 13 and 14 of the wire 11, a part of the coating layer 11*b* may be removed to expose the conductor 11*a*.

As illustrated in FIG. 2, the pair of terminal electrodes 20 and 30 are disposed on the side surface 74 of the second portion 70 of the exterior body 50, which will be described later. The pair of terminal electrodes 20 and 30 are disposed at both end portions of the side surface 74 in the direction Y to be separated from each other. Each of the terminal electrodes 20 and 30 may be made of a conductive metal material.

Metal materials include copper, silver, nickel, or chromium. Each of the terminal electrodes 20 and 30 may be made of the same material as the conductor 11*a* of the wire 11.

Each of the terminal electrodes 20 and 30 has a flat plate shape. Each of the terminal electrodes 20 and 30 has a substantially rectangular shape in a plan view in the direction Z. Each of the terminal electrodes 20 and 30 is disposed on the side surface 74 such that its longitudinal direction is in the direction X. The terminal electrodes 20 and 30 includes base end portions 21 and 31 and tip portions 22 and 32, respectively. The base end portions 21 and 31 of the terminal electrodes 20 and 30 are connected to the connection portions 13 and 14 of the wire 11, respectively.

The terminal electrodes 20 and 30 oppose the coil 10. In the present embodiment, the terminal electrodes 20 and 30 face, in the direction Z, both end portions of the coil 10 in the direction Y. The entire terminal electrodes 20 and 30 may not oppose the coil 10, and at least a part of each of the terminal electrodes 20 and 30 may oppose the coil 10.

The core portion 40 has a substantially rectangular parallelepiped shape and is disposed such that its lateral direction is in the direction X. The coil portion 12 is disposed on the outer side of the core portion 40. The core portion 40 may be made of a resin, ferrite or alumina. The core portion 40 may be made of the same resin or a different resin from a first portion 60 of the exterior body 50, which will be described later. A shape of the core portion 40 is not limited and may be, for example, a cylindrical shape. A pair of flange portions may be formed at both end portions of the core portion 40 in the direction X. The pair of flange portions may be formed in the shapes of walls that extend from the core portion 40 in the directions Y and Z and face each other in the direction X. The pair of flange portions may restrict movement of the coil 10 in the direction X.

The exterior body 50 has a rectangular parallelepiped shape. The exterior body 50 may have a rectangular parallelepiped shape in which corners and ridges are chamfered, or a rectangular parallelepiped shape in which corners and ridges are rounded. A width of the exterior body 50 in the direction X may be 0.2 mm, and a width thereof in the direction Y may be 0.4 mm. The exterior body 50 includes the first portion 60 and the second portion 70 that are disposed to overlap each other in the direction Z.

The first portion 60 has a rectangular parallelepiped shape and covers the coil 10 and the core portion 40. The first portion 60 is made of a resin. The resin constituting the first portion 60 may be a liquid crystal polymer, a polyimide resin, crystalline polystyrene, an epoxy resin, or a fluororesin. The polyimide resin may be a bismaleimide resin. The fluororesin may be a polytetrafluoroethylene resin (PTFE). A relative permittivity of the resin constituting the first portion 60 may be 2 or more and 4 or less. The resin constituting the first portion 60 may include a filler or impurities for enhancing characteristics of the coil component 1.

The first portion 60 includes a pair of end surfaces 61 and 62 and four side surfaces 63, 64, 65, and 66. The pair of end surfaces 61 and 62 oppose each other in the direction Y. Each of the end surfaces 61 and 62 is a flat surface that extends in the direction X and the direction Z. The four side surfaces 63, 64, 65, and 66 connect the pair of end surfaces 61 and 62 to each other. The side surface 63 and the side surface 64 oppose each other in the direction Z. The side surface 63 and the side surface 64 are flat surfaces that extend in the direction X and the direction Y. The side surface 63 and the side surface 64 have rectangular shapes defined by a pair of short sides in the direction X and a pair of long sides in the direction Y. The side surface 64 is in contact with a side surface 73 of the second portion 70, which will be described later. The side surface 65 and the side surface 66 oppose each other in the direction X. The side surface 65 and the side surface 66 are flat surfaces that extend in the direction Y and the direction Z.

A thickness T1 of the first portion 60 in the direction Z may be 180 μm or more and 320 μm or less. The thickness T1 is a width between the side surface 63 and the side surface 64. In the present embodiment, the first portion 60 covers the entire coil 10 and core portion 40. The first portion 60 may not necessarily cover the entire coil 10 and core portion 40, and a part of the coil 10 or a part of the core portion 40 may be exposed to the outside of the first portion 60.

The second portion 70 has a rectangular parallelepiped shape and is disposed between the coil 10 and the pair of terminal electrodes 20 and 30. The second portion 70 includes a low permittivity material having a relative permittivity lower than the relative permittivity of the resin constituting the first portion 60. The low permittivity material includes a material having a relative permittivity lower than the relative permittivity of the resin constituting the first portion 60. In the present embodiment, the entire second portion 70 is made of the low permittivity material. The entire second portion 70 may not be made of the low permittivity material. The second portion 70 may include, for example, a first layer made of the low permittivity material and a second layer made of a material other than the low permittivity material. The first and second layers are laminated to each other. The low permittivity material included in the second portion 70 may be a liquid crystal polymer, a polyimide resin, crystalline polystyrene, an epoxy resin, or a fluororesin. The polyimide resin may be a bismaleimide resin. The fluororesin may be a polytetrafluoroethylene resin (PTFE). The relative permittivity of the low permittivity material may be, for example, 2 or more and 3 or less. The second portion 70 may include a filler or impurities for enhancing the characteristics of the coil component 1 in addition to the low permittivity material.

The second portion 70 includes a pair of end surfaces 71 and 72 and four side surfaces 73, 74, 75, and 76. The pair of end surfaces 71 and 72 oppose each other in the direction Y. Each of the end surfaces 71 and 72 is a flat surface that extends in the direction X and the direction Z. The four side surfaces 73, 74, 75, and 76 connect the pair of end surfaces 71 and 72 to each other. The side surface 73 and the side surface 74 oppose each other in the direction Z. The side surface 73 and the side surface 74 are flat surfaces that extend in the direction X and the direction Y. The side surface 73 and the side surface 74 have rectangular shapes defined by a pair of short sides in the direction X and a pair of long sides in the direction Y. The side surface 73 is in contact with the side surface 64 of the first portion 60. The side surfaces 75 and the side surface 76 oppose each other in direction X. The side surface 75 and the side surface 76 are flat surfaces that extend in the direction Y and the direction Z.

A thickness T2 of the second portion 70 in the direction Z may be 5 μm or more and 20 μm or less, or 10 μm or more and 15 μm or less. The thickness T2 is a width between the side surface 73 and the side surface 74. The thickness T2 may be, for example, equal to or more than one-twentieth and equal to or less than one-tenth of the thickness T1.

An outer edge shape of the side surface 73 of the second portion 70 coincides with an outer edge shape of the side surface 64 of the first portion 60. Thus, the end surfaces 61 and 62 of the first portion 60 and the end surfaces 71 and 72 of the second portion 70 are flush with each other. The side surfaces 65 and 66 of the first portion 60 and the side surfaces 75 and 76 of the second portion 70 are flush with each other.

In the present embodiment, the second portion 70 is disposed on the entire side surface 64. The second portion 70 may not be disposed on the entire side surface 64. The second portion 70 may be disposed on at least a partial region between the coil 10 and the terminal electrodes 20 and 30 in the side surface 64. For example, the second portion 70 may be disposed only between the coil 10 and the tip portions 22 and 32 of the terminal electrodes 20 and 30 illustrated in FIG. 2.

Figure 4:
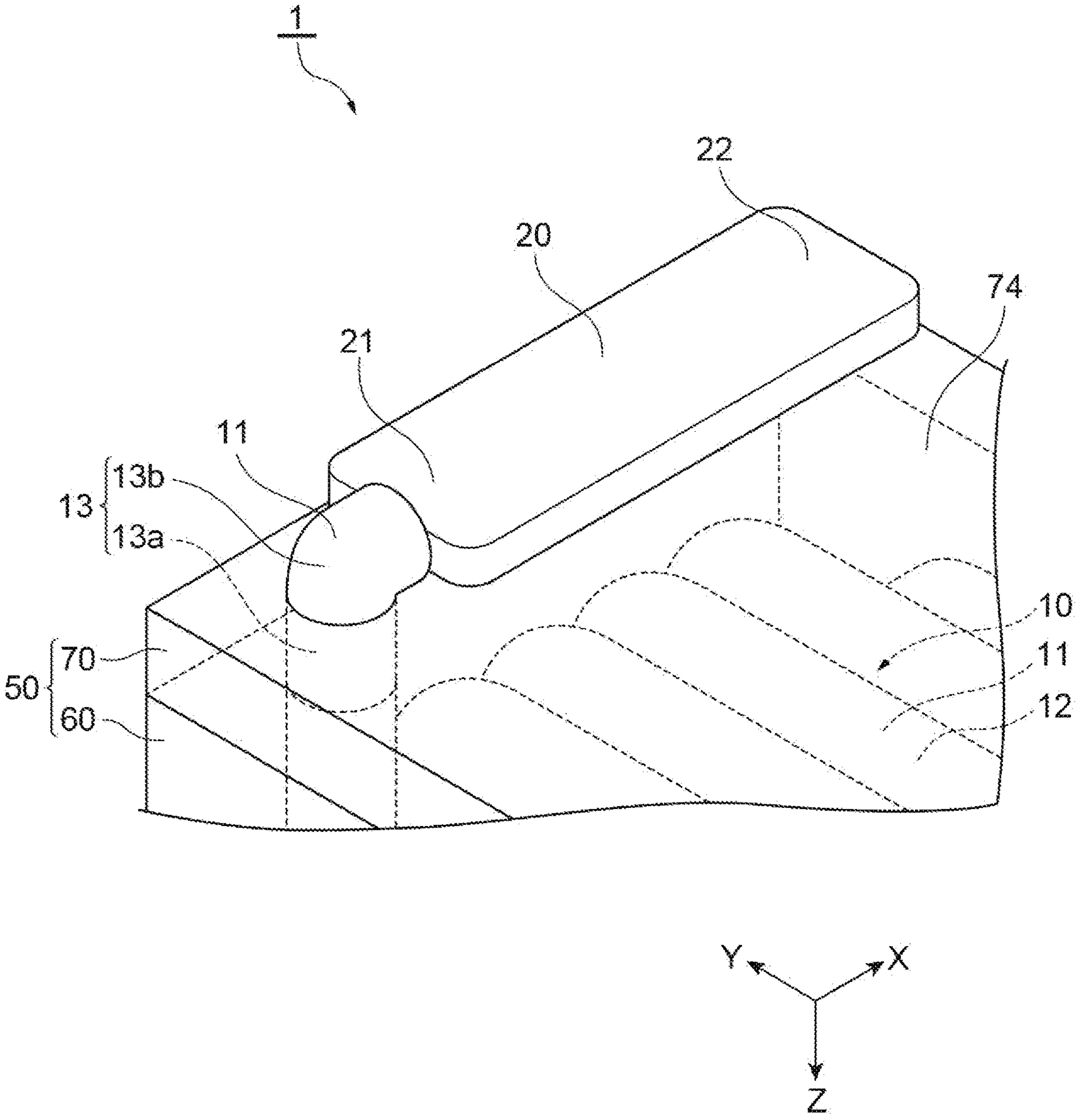
FIG. 4 is an enlarged view of the connection portion of the wire and the terminal electrode.

A detailed configuration of the connection portions 13 and 14 of the wire 11 and the terminal electrodes 20 and 30 according to the present embodiment will be described with reference to FIGS. 3 and 4. FIG. 4 is an enlarged view of the connection portion 13 of the wire 11 and the terminal electrode 20. Hereinafter, the connection portion 13 and the terminal electrode 20 will be described as an example, the connection portion 14 and the terminal electrode 30 according to the present embodiment have the same configurations as the connection portion 13 and the terminal electrode 20.

The connection portion 13 of the wire 11 includes an inner portion 13*a* disposed inside the exterior body 50 and an outer portion 13*b* disposed on the exterior body 50. The inner portion 13*a* is continuous with the coil portion 12 inside the first portion 60. The outer portion 13*b* is continuous with the base end portion 21 of the terminal electrode 20 outside the exterior body 50. The connection portion 13 is bent such that the inner portion 13*a* and the outer portion 13*b* extend in different directions from each other. In the present embodiment, the connection portion 13 is bent such that an angle between the inner portion 13*a* and the outer portion 13*b* is approximately 90°. The inner portion 13*a* extends in the direction Z intersecting the side surface 74 of the second portion 70. The outer portion 13*b* extends in the direction X along the side surface 74. The terminal electrode 20 connected to the outer portion 13*b* is disposed to extend in the direction X, similarly to the outer portion 13*b*.

As illustrated in FIG. 3, a portion of the outer portion 13*b* opposes the coil 10 in direction Z. As described above, the wire 11 includes the conductor 11*a* and the coating layer 11*b* covering the conductor 11*a*. In the outer portion 13*b* of the wire 11, the coating layer 11*b* covers the conductor 11*a*. Thus, the coating layer 11*b* is located between the conductor 11*a* of the outer portion 13*b* and the coil 10. The coating layer 11*b* may be made of a low permittivity material having a relative permittivity lower than a relative permittivity of the resin constituting the first portion 60. The coating layer 11*b* may not cover the conductor 11*a* in the entire outer portion 13*b*. For example, a part of the coating layer 11*b* included in the outer portion 13*b* may be removed to expose the conductor 11*a*.

As illustrated in FIG. 3, a thickness of the terminal electrode 20 in the direction Z is smaller than a diameter of the outer portion 13*b* of the wire 11. The thickness of the terminal electrode 20 in the direction Z may be 10 μm or more and 20 μm or less. The terminal electrode 20 is fixed to the side surface 74 with an adhesive 80. The terminal electrode 20 may be disposed to be slightly separated from the side surface 74. The terminal electrode 20 may not be fixed to the side surface 74.

The connection portion 14 and the terminal electrode 30 have the same configurations as the connection portion 13 and the terminal electrode 20 described above. As illustrated in FIG. 2, the connection portion 14 includes an inner portion 14*a* disposed inside the exterior body 50 and an outer portion 14*b* disposed on the exterior body 50. The inner portion 14*a* and the outer portion 14*b* of the connection portion 14 correspond to the inner portion 13*a* and the outer portion 13*b* of the connection portion 13. The base end portion 31 of the terminal electrode 30 is continuous with the outer portion 14*b* of the connection portion 14. Similarly to the terminal electrode 20, the terminal electrode 30 is fixed to the side surface 74 with an adhesive.

Figure 5:
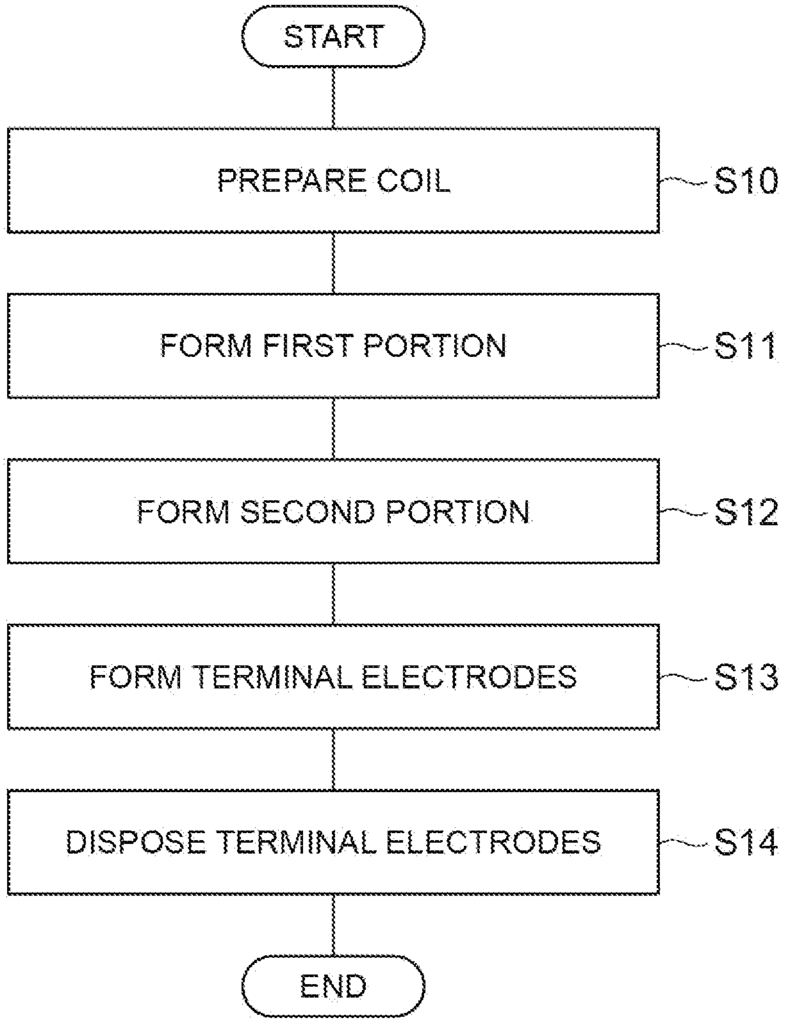
FIG. 5 is a flowchart illustrating a making process of the coil component according to the first embodiment.

An example of a method for making the coil component 1 according to the present embodiment will be described with reference to FIGS. 5 to 11. FIG. 5 is a flowchart illustrating a making process of the coil component 1 according to the present embodiment. FIGS. 6 to 11 are diagrams illustrating the making process of the coil component 1 according to the present embodiment.

Figure 6:
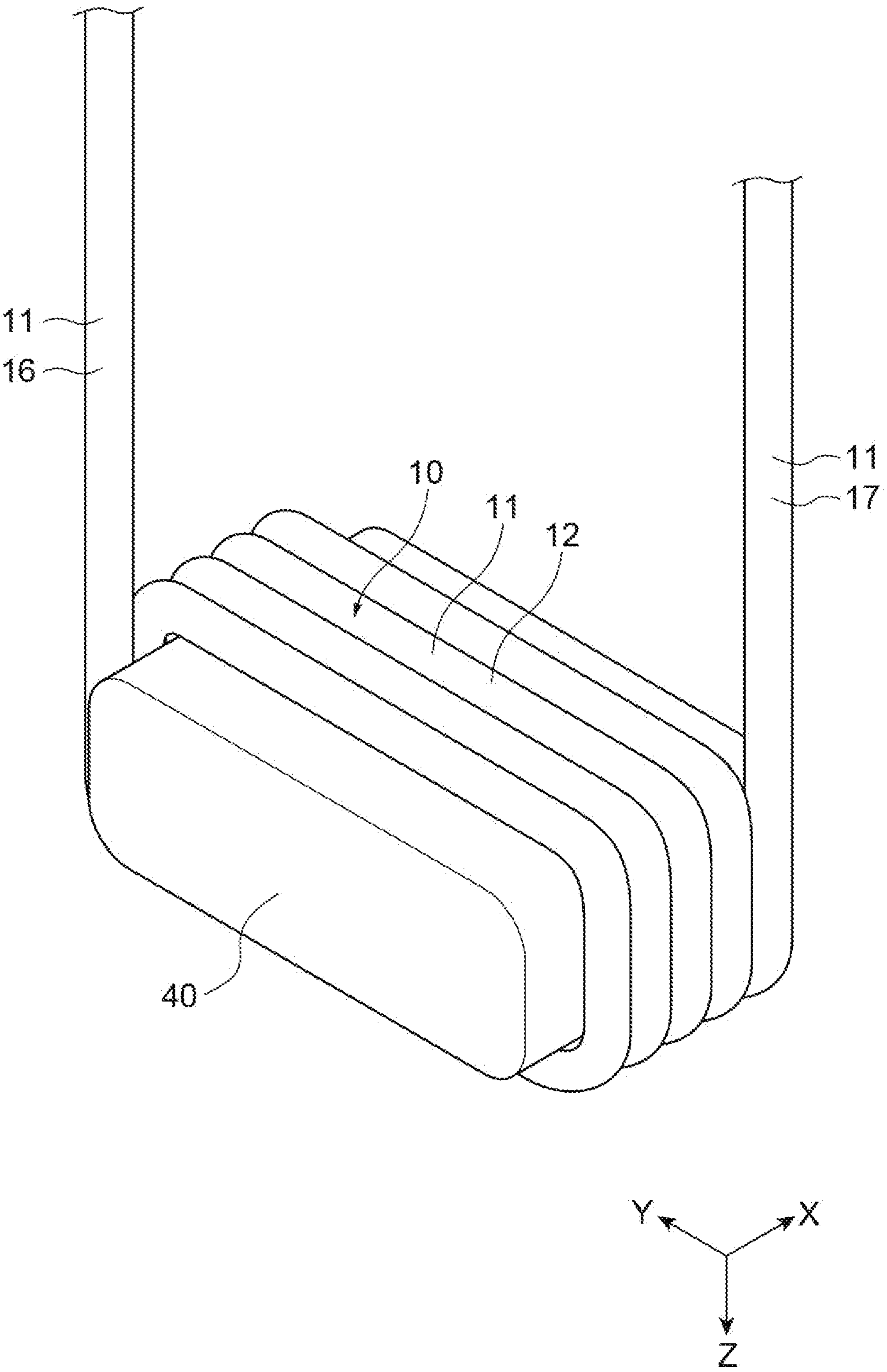
FIG. 6 is a diagram illustrating the making process of the coil component according to the first embodiment.

First, the coil 10 illustrated in FIG. 6 is prepared (step S10). In step S10, the coil 10 may be formed through spirally winding a part of the wire 11 around the core portion 40, or an already formed coil 10 may be prepared. The portion of the wire 11 illustrated in FIG. 6 that is spirally wound is the coil portion 12. The wire 11 includes surplus portions 16 and 17 continuous with both ends of the coil portion 12. The surplus portions 16 and 17 are portions that will later serve as the pair of terminal electrodes 20 and 30 and the connection portions 13 and 14.

Figure 7:
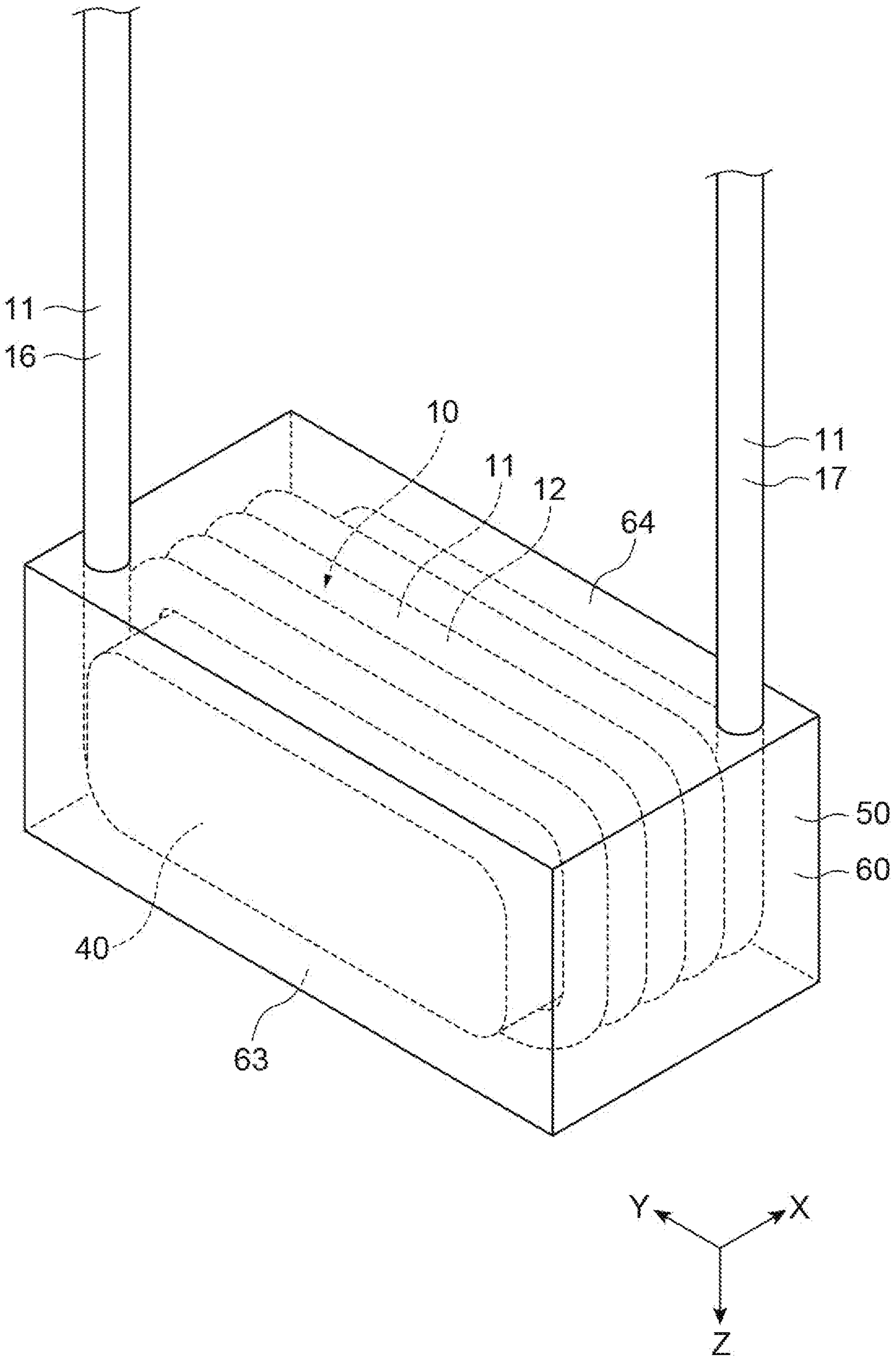
FIG. 7 is a diagram illustrating the making process of the coil component according to the first embodiment.

Next, the first portion 60 illustrated in FIG. 7 is formed (step S11). The coil 10 and the core portion 40 are fixed in a mold. A resin intended to constitute the first portion 60 is softened thought heating, and the softened resin is poured into the mold in which the coil 10 and the core portion 40 are fixed. After the resin constituting the first portion 60 has been cooled and solidified, the coil 10 and the core portion 40 covered with the first portion 60 are taken out from the mold. A method for forming the first portion 60 is not limited to the method described above. In the present embodiment, the first portion 60 is formed to cover the entire coil 10 and core portion 40, but the first portion 60 may be formed such that a part of the coil 10 or a part of the core portion 40 is exposed.

Figure 8:
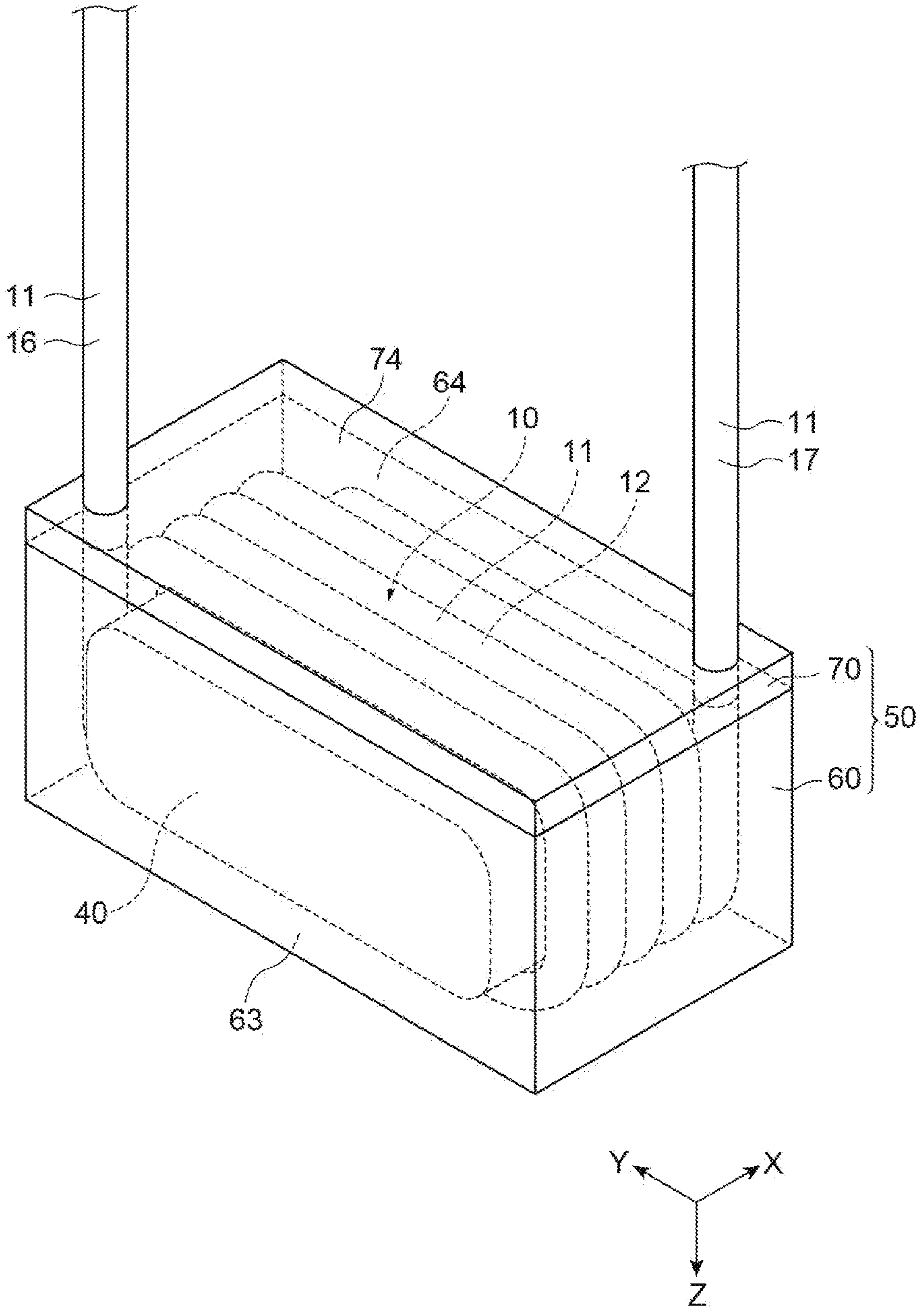
FIG. 8 is a diagram illustrating the making process of the coil component according to the first embodiment.

Next, the second portion 70 illustrated in FIG. 8 is formed (step S12). The coil 10 and the core portion 40 covered with the first portion 60 are fixed in a mold, and a material of the second portion 70 that has been softened through heating is poured into the mold. In the present embodiment, the material of the second portion 70 is poured to spread over the entire side surface 64. The material of the second portion 70 includes a low permittivity material. After the material of the second portion 70 has been cooled and solidified, the coil 10 and the core portion 40 on which the second portion 70 has been formed are taken out from the mold. A method for forming the second portion 70 is not limited to the method described above.

Figure 9:
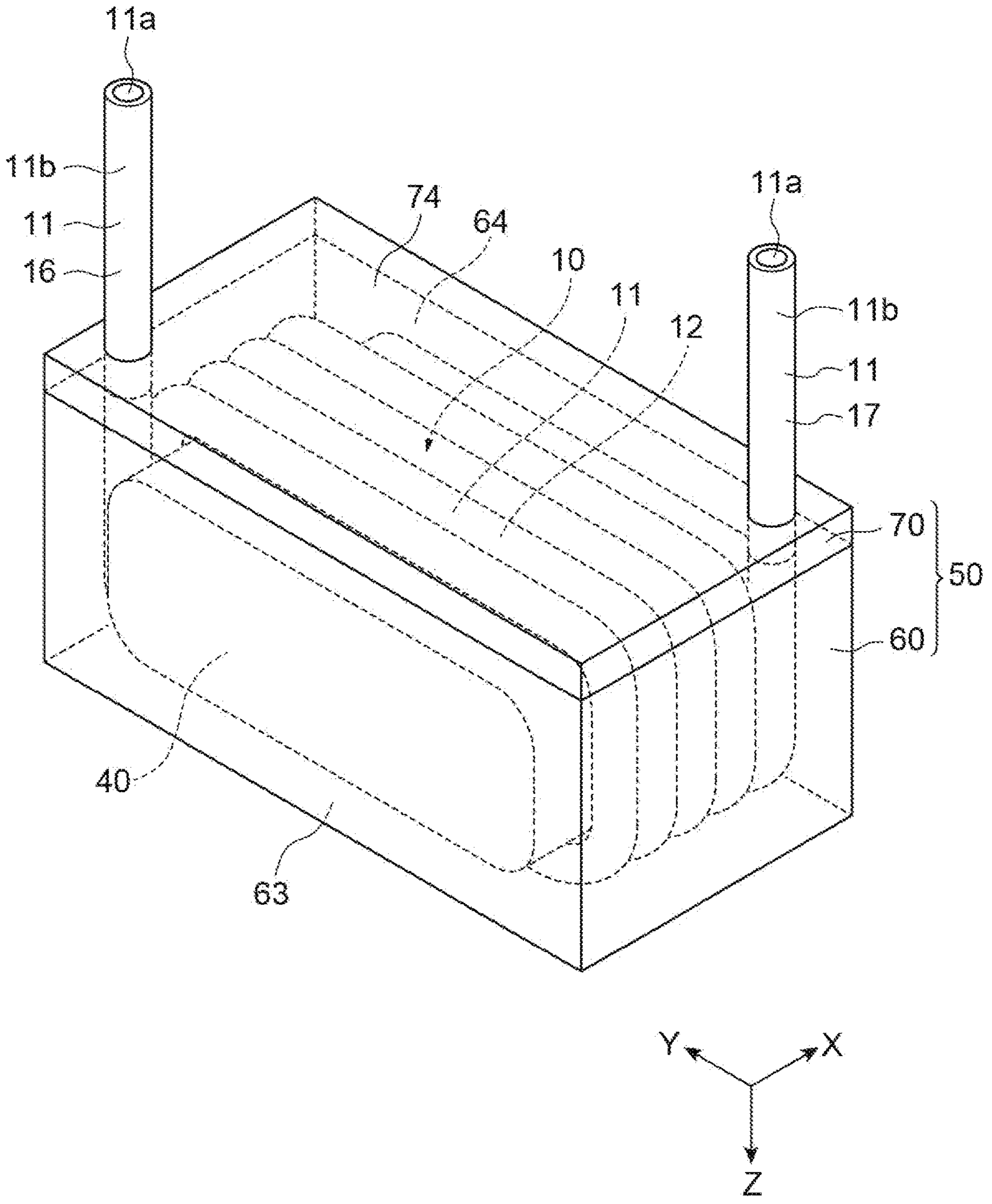
FIG. 9 is a diagram illustrating the making process of the coil component according to the first embodiment.

Next, the pair of terminal electrodes 20 and 30 are formed (step S13). As illustrated in FIG. 9, first, the surplus portions 16 and 17 of the wire 11 extending from the side surface 74 to the outside of the exterior body 50 are cut. The surplus portions 16 and 17 are cut while the portions that will later serve as the pair of terminal electrodes 20 and 30 and the connection portions 13 and 14 are left. After cutting the wire 11, the coating layer 11*b* at both end portions of the wire 11 are removed to expose the conductor 11*a*. The coating layer 11*b* may be removed, for example, using laser irradiation.

Figure 10:
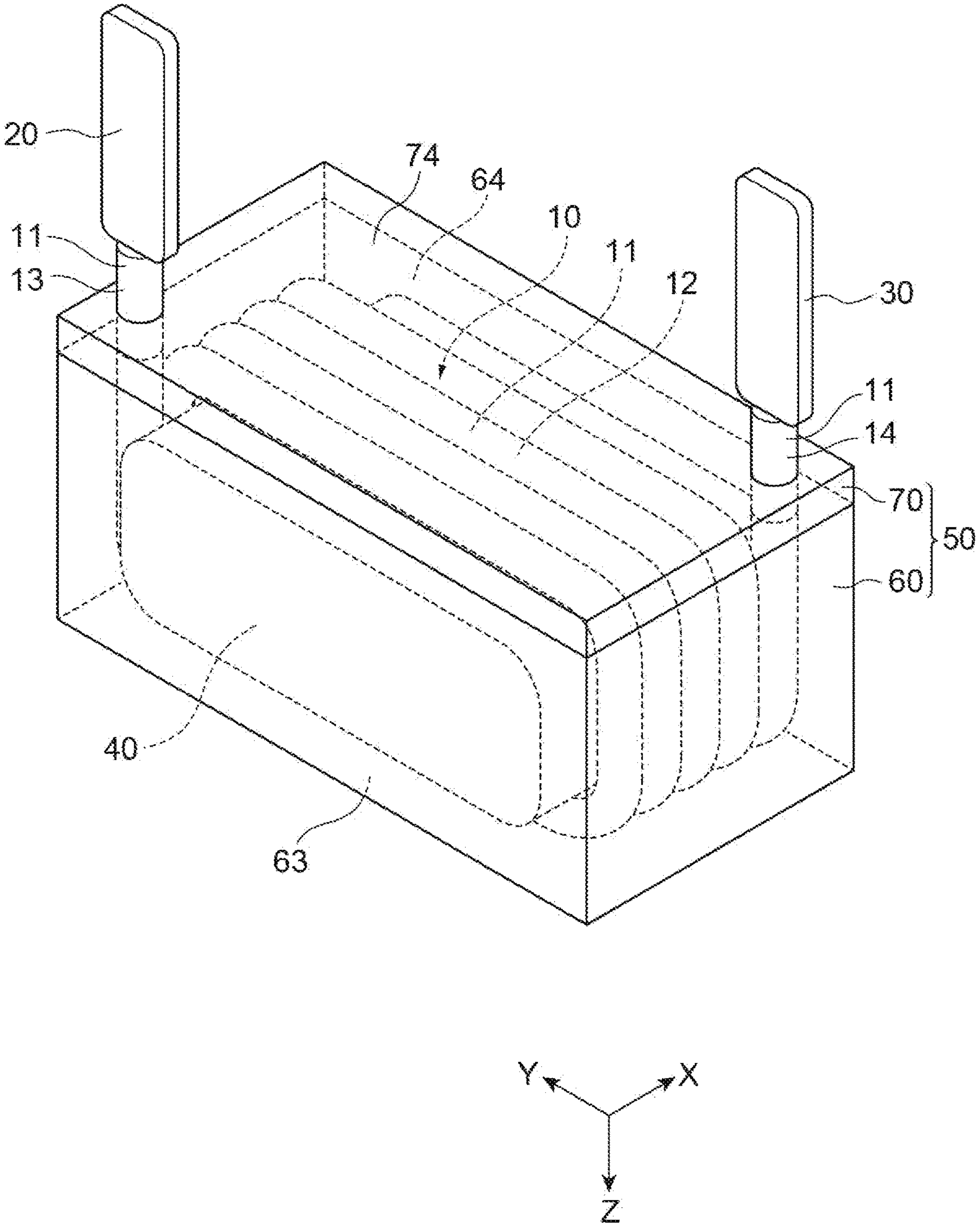
FIG. 10 is a diagram illustrating the making process of the coil component according to the first embodiment.

Next, through pressing both end portions of the wire 11 from which the coating layer 11*b* has been removed, the terminal electrodes 20 and 30 having flat plate shapes as illustrated in FIG. 10 are formed. Through sandwiching both end portions of the wire 11 and pressing them in the direction X, the terminal electrodes 20 and 30 extending in the direction Y and the direction Z may be formed.

Figure 11:
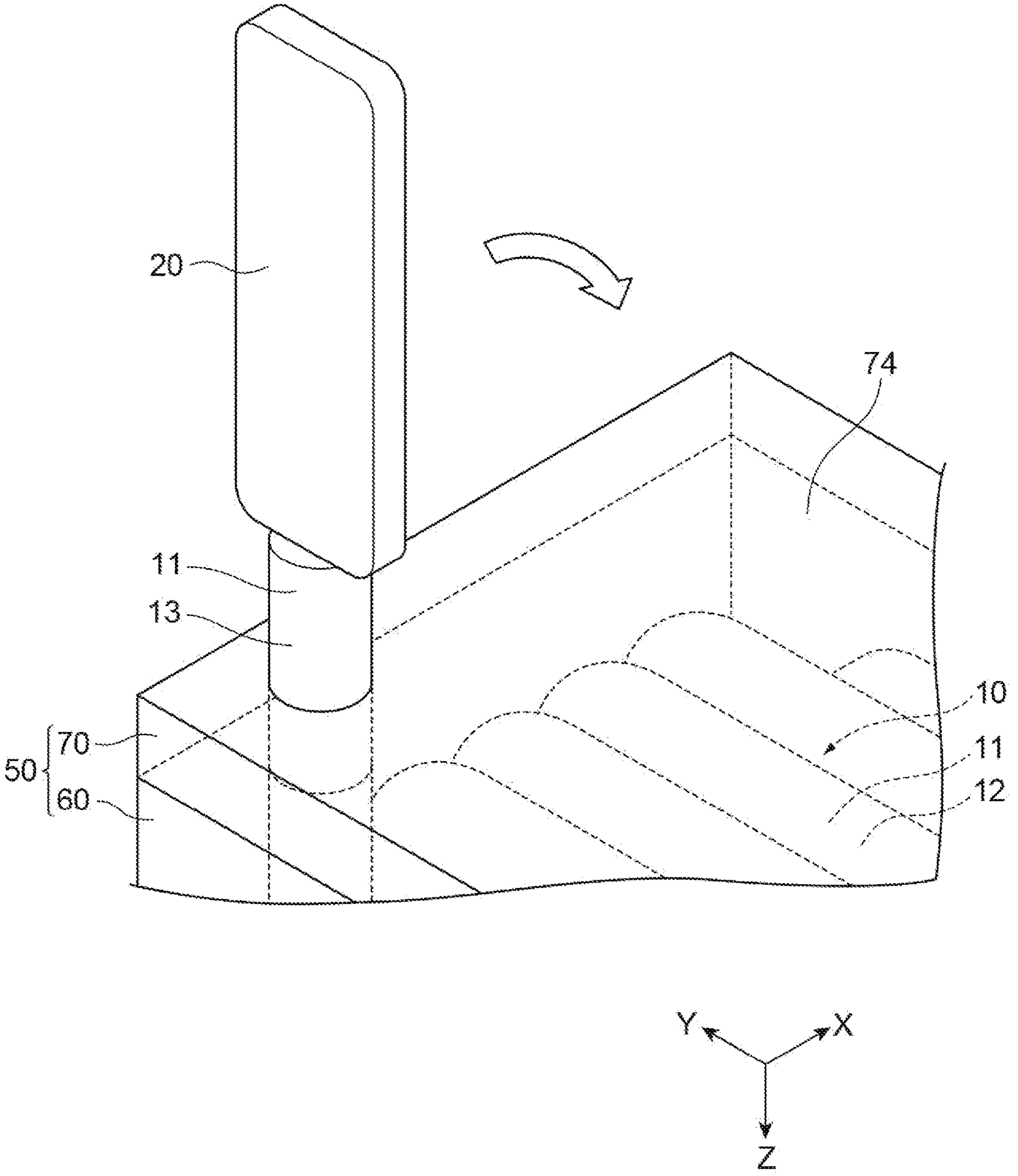
FIG. 11 is a diagram illustrating the making process of the coil component according to the first embodiment.

Next, the pair of terminal electrodes 20 and 30 are disposed on the side surface 74 (step S14). As illustrated in FIG. 11, the terminal electrode 20 is disposed on the side surface 74 through tilting the terminal electrode 20 toward the side surface 74 and bending the connection portion 13 of the wire 11. The terminal electrode 30 is also disposed on the side surface 74 using the same method as that of the terminal electrode 20. The process of disposing the pair of terminal electrodes 20 and 30 (step S14) may include a process of fixing the tilted terminal electrodes 20 and 30 to the side surface 74 with an adhesive. In this way, the making process of the coil component 1 is completed.

Figure 12:
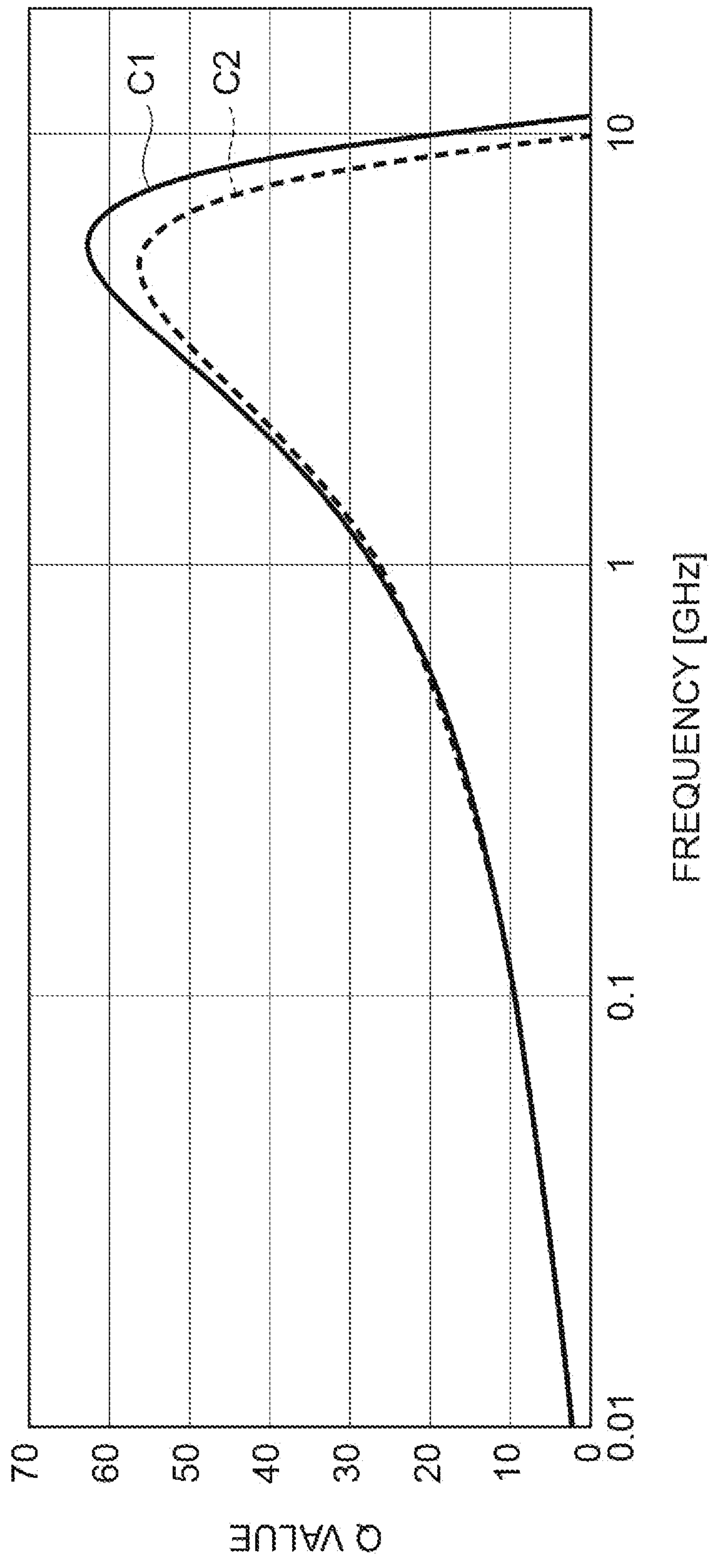
FIG. 12 is a graph illustrating frequency characteristics of the coil component.

With reference to FIG. 12, a difference in frequency characteristics between a coil component in which the exterior body 50 has the second portion 70 and a coil component in which the exterior body 50 does not include the second portion 70 will be described. The coil component in which the exterior body 50 includes the second portion 70 is the coil component 1 described above. In the coil component in which the exterior body 50 does not include the second portion 70, the exterior body 50 includes only the first portion 60.

FIG. 12 is a graph illustrating the frequency characteristics of the coil components. The horizontal axis in FIG. 12 illustrates a frequency [GHz] of a current flowing through the coil components, and a vertical axis in FIG. 12 illustrates a Q value. FIG. 12 illustrates characteristics C1 and C2. The characteristic C1 is a frequency characteristic in the coil component in which the exterior body 50 includes the second portion 70. The characteristic C2 is a frequency characteristic in the coil component in which the exterior body 50 does not include the second portion 70.

As illustrated in FIG. 12, in both the characteristics C1 and C2, the Q value gradually increases as the frequency of the current changes from a low frequency band to a high frequency band. However, when the frequency of the current exceeds a certain frequency, the Q value sharply decreases to zero. A frequency at which the Q value in the characteristic C1 is zero is higher than a frequency at which the Q value in the characteristic C2 is zero. That is, the coil component in which the exterior body 50 includes the second portion 70 functions as a coil component even at a higher frequency than the coil component in which the exterior body 50 does not include the second portion 70. The reason why the coil component in which the exterior body 50 includes the second portion 70 functions as a coil component even at a higher frequency is considered that the stray capacitance between the terminal electrodes 20 and 30 and the coil 10 is reduced by the low permittivity material included in the second portion 70, and thus a decrease in self-resonant frequency in the coil component 1 is inhibited.

As described above, in the coil component 1 according to the present embodiment, the second portion 70 including the low permittivity material having a relative permittivity lower than a relative permittivity of the resin of the first portion 60 is disposed between the coil 10 and the terminal electrodes 20 and 30. Therefore, the stray capacitance generated between the coil component 1 and the terminal electrodes 20 and 30 is reduced by the low permittivity material of the second portion 70, and a decrease in self-resonant frequency in the coil component 1 is inhibited.

The coil 10 includes the wire 11. The wire 11 includes the coil portion 12 (first wire portion) having a spiral shape and the pair of connection portions 13 and 14 (second wire portions). The pair of connection portions 13 and 14 are continuous respectively with the corresponding terminal electrodes 20 and 30. Each of the terminal electrodes 20 and 30 has a flat plate shape.

For example, in a case in which a physical impact is applied to the coil component 1, electrical connection between the terminal electrodes 20 and 30 and the coil 10 may be broken. In the configuration in which the terminal electrodes 20 and 30 and the connection portions 13 and 14 of the wire 11 are continuous with each other, the electrical connection between the terminal electrodes 20 and 30 and the coil 10 tends not to be broken even in the case in which a physical impact is applied to the coil component 1.

The configuration in which the terminal electrodes 20 and 30 have flat plate shapes easily realizes electrical connection between the terminal electrodes 20 and 30 and another electronic component when the coil component 1 is mounted on the electronic component.

The second portion 70 includes the flat side surface 74 on which the pair of terminal electrodes 20 and 30 are disposed. The connection portions 13 and 14 respectively include the inner portions 13*a* and 14*a* disposed inside the exterior body 50, and the outer portions 13*b* and 14*b* that are disposed on the exterior body 50 and continuous with the corresponding terminal electrodes 20 and 30. The inner portions 13*a* and 14*a* extend in the direction Z intersecting the side surface 74, and the outer portions 13*b* and 14*b* extend in the direction X along the side surface 74.

In this case, the coil 10 covered with the exterior body 50 and the terminal electrodes 20 and 30 disposed on the exterior body 50 are more reliably connected by the connection portions 13 and 14.

The wire 11 includes the conductor 11*a* and the coating layer 11*b* covering the conductor 11*a* and having electrical insulation.

In this case, since the conductor 11*a* is protected by the coating layer 11*b*, the conductor 11*a* tends not to be damaged even in a case in which the wire 11 is bent.

The coating layer 11*b* may be made of a low permittivity material. When the coating layer 11*b* is made of a low permittivity material, the stray capacitance generated between the connection portions 13 and 14 and the coil 10 is reduced by the low permittivity material of the coating layer 11*b* even in a case in which a part of the connection portions 13 and 14 opposes the coil. Thus, a decrease in self-resonant frequency in the coil component 1 is inhibited.

In the method for making the coil component 1 according to the above-described embodiment, the second portion 70 is formed between the coil 10 and the terminal electrodes 20 and 30 with the material including the low permittivity material having a relative permittivity lower than a relative permittivity of the first portion 60. Therefore, the stray capacitance generated between the coil 10 and the terminal electrodes 20 and 30 is reduced by the low permittivity material of the second portion 70, and a decrease in self-resonance frequency in the coil component 1 is inhibited.

The step of preparing the coil 10 includes preparing the coil 10 made of a wire 11. The method further includes forming the pair of terminal electrodes 20 and 30 continuous with the wire 11 through pressing both end portions of the wire 11 before the step of disposing the pair of terminal electrodes 20, 30.

In this case, connecting the terminal electrodes 20 and 30 to the coil 10 is unnecessary in the making process of the coil component 1, and thus the making process is facilitated.

The wire 11 and the terminal electrodes 20 and 30 are continuous with each other, and thus electrical connection between the terminal electrodes 20 and 30 and the coil 10 tends not to be broken even in the case in which a physical impact is applied to the coil component 1.

Second Embodiment

Figure 13:
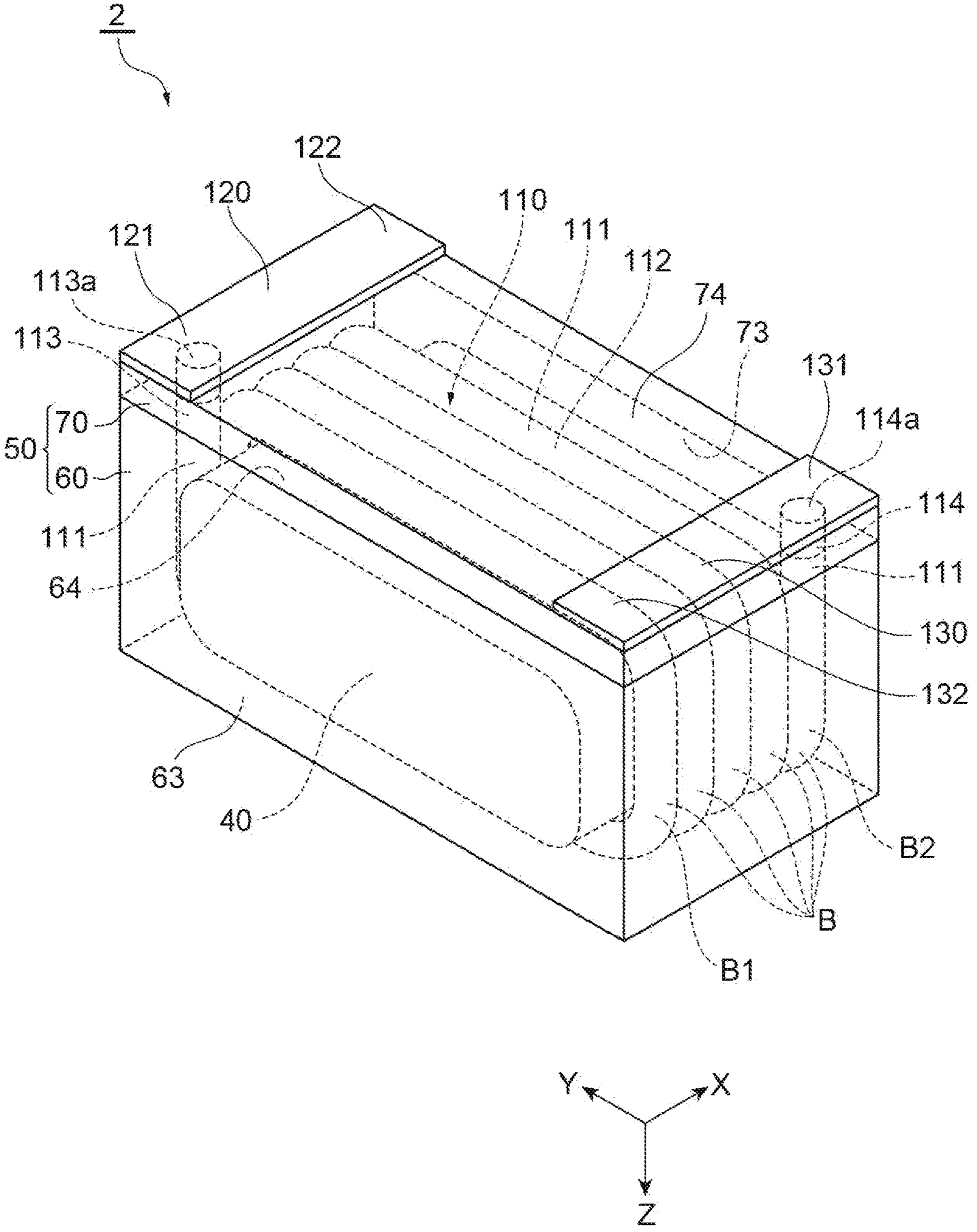
FIG. 13 is a perspective view illustrating a coil component according to a second embodiment.

An example of a coil component 2 according to a second embodiment will be described with reference to FIG. 13. FIG. 13 is a perspective view illustrating the coil component 2 according to the second embodiment. In the description of the second embodiment, points different from the first embodiment described above will be mainly described, and the description of common points may be omitted. The coil component 2 according to the present embodiment is different from the coil component 1 according to the first embodiment mainly in terms of a configuration and a formation process of terminal electrodes.

The coil component 2 includes a coil 110, a pair of terminal electrodes 120 and 130, the core portion 40, and the exterior body 50. The coil 110 includes a wire 111. The wire 111 includes a portion 112 having a spiral shape. Hereinafter, the portion 112 of the wire 111 is referred to as a coil portion 112. The coil portion 112 is disposed on an outer side of the core portion 40. In the following description, as in the first embodiment, an axial direction of the coil 110 is the direction X, a direction intersecting the direction X is the direction Y, and a direction intersecting the direction X and the direction Y is the direction Z. In the present embodiment, the directions X, Y and Z are orthogonal to each other.

The wire 111 includes a pair of connection portions 113 and 114. The pair of connection portions 113 and 114 are continuous with both ends of the coil portion 112, and electrically connect the coil 110 and the pair of terminal electrodes 120 and 130. For example, when the coil portion 112 is the first wire portion, the connection portions 113 and 114 are the second wire portions.

The coil portion 112 includes a plurality of turns B. That is, the coil 110 includes a plurality of turns B. The plurality of turns B are arranged in the direction X. A region defined by each turn B has a rectangular shape in which the corners are rounded when viewed in the direction X. A shape of each turn B may be an annular shape. Turns B1 and B2 located at both ends of the plurality of turns B in the direction X are connected respectively to the terminal electrodes 120 and 130 via the connection portions 113 and 114.

The connection portions 13 and 14 of the wire 11 according to the first embodiment include the inner portions 13*a* and 14*a* disposed inside the exterior body 50, and the outer portions 13*b* and 14*b* disposed on the exterior body 50. The connection portions 113 and 114 of the wire 111 according to the present embodiment include only inner portions disposed inside the exterior body 50 as illustrated in FIG. 13, and do not include outer portions.

The connection portions 113 and 114 respectively include end surfaces 113*a* and 114*a*. The end surfaces 113*a* and 114*a* are flush with the side surface 74 of the second portion 70. Thus, no step is formed between the end surfaces 113*a* and 114*a* and the side surface 74.

The pair of terminal electrodes 120 and 130 are disposed on the side surface 74 of the exterior body 50. The pair of terminal electrodes 120 and 130 are disposed at both end portions of the side surface 74 in the direction Y to be separated from each other. Each of the terminal electrodes 120 and 130 has a flat plate shape. Each of the terminal electrodes 120 and 130 has a rectangular shape in a plan view in the direction Z. Each of the terminal electrodes 120 and 130 is disposed on the side surface 74 such that its longitudinal direction is in the direction X. The terminal electrodes 120 and 130 respectively include base end portions 121 and 131, and tip portions 122 and 132. Surfaces of the base end portions 121 and 131 are respectively in contact with the end surfaces 113*a* and 114*a* of the connection portions 113 and 114. Thus, the pair of terminal electrodes 120 and 130 are electrically connected to the coil 110.

The terminal electrodes 120 and 130 oppose the coil 110. In the present embodiment, the terminal electrodes 120 and 130 oppose, in the direction Z, both end portions of the coil 110 in the direction Y. The entire terminal electrodes 120 and 130 may not oppose the coil 110, and at least a part of the terminal electrodes 120 and 130 may oppose the coil 110.

Figure 14:
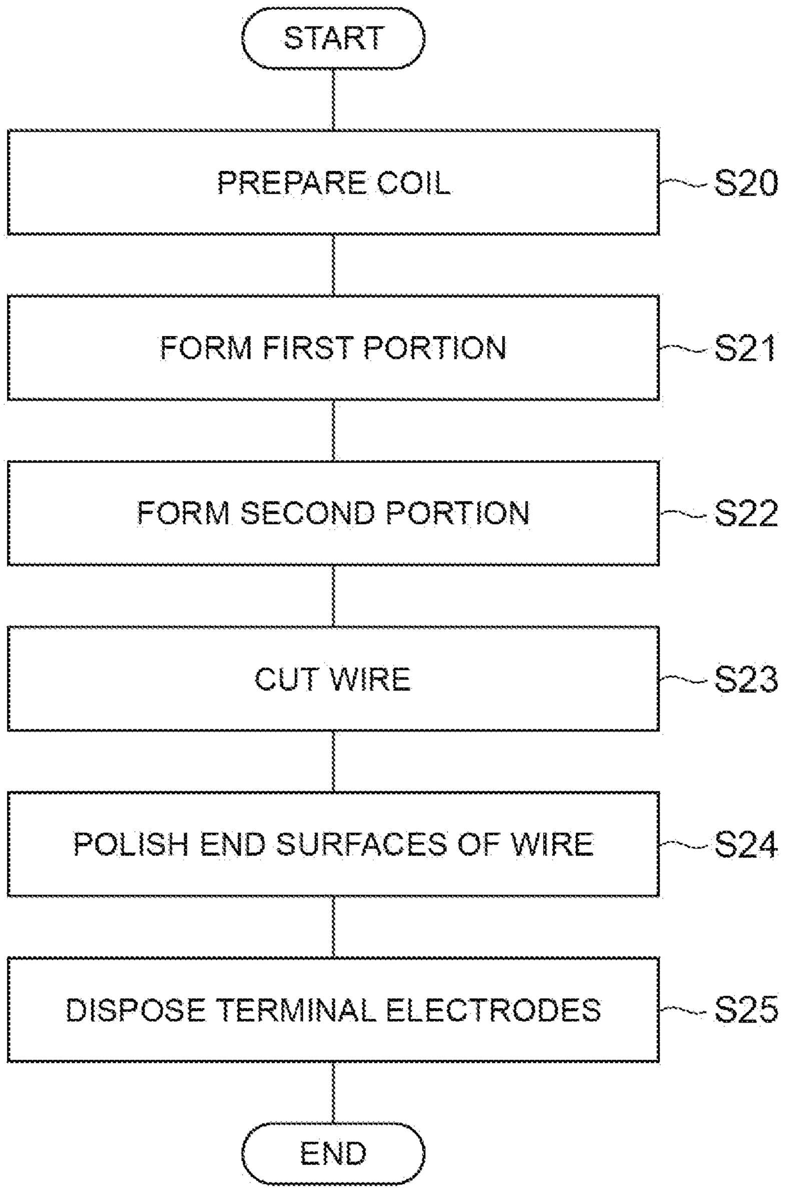
FIG. 14 is a flowchart illustrating a making process of the coil component according to the second embodiment.
Figure 15:
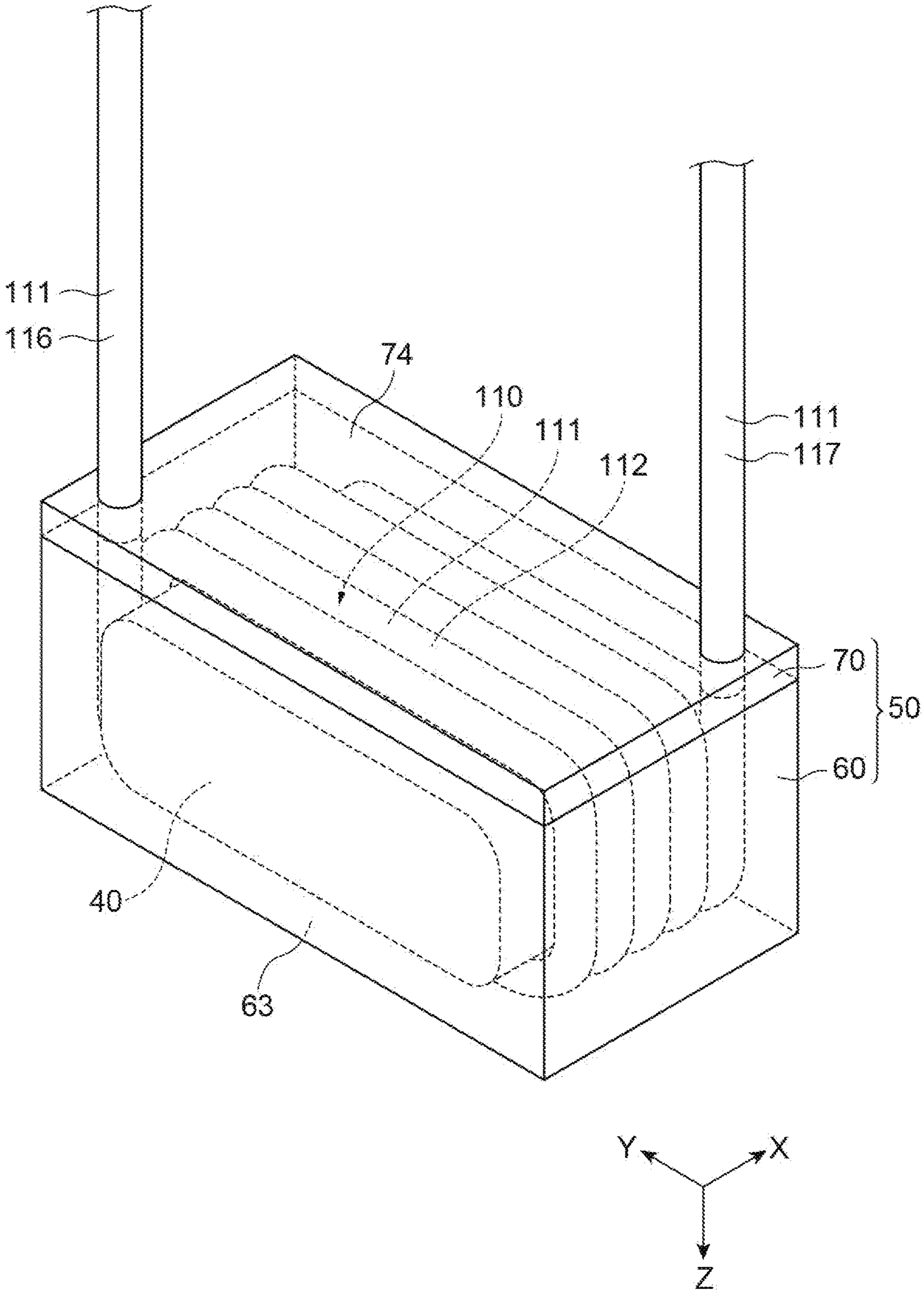
FIG. 15 is a diagram illustrating the making process of the coil component according to the second embodiment.
Figure 16:
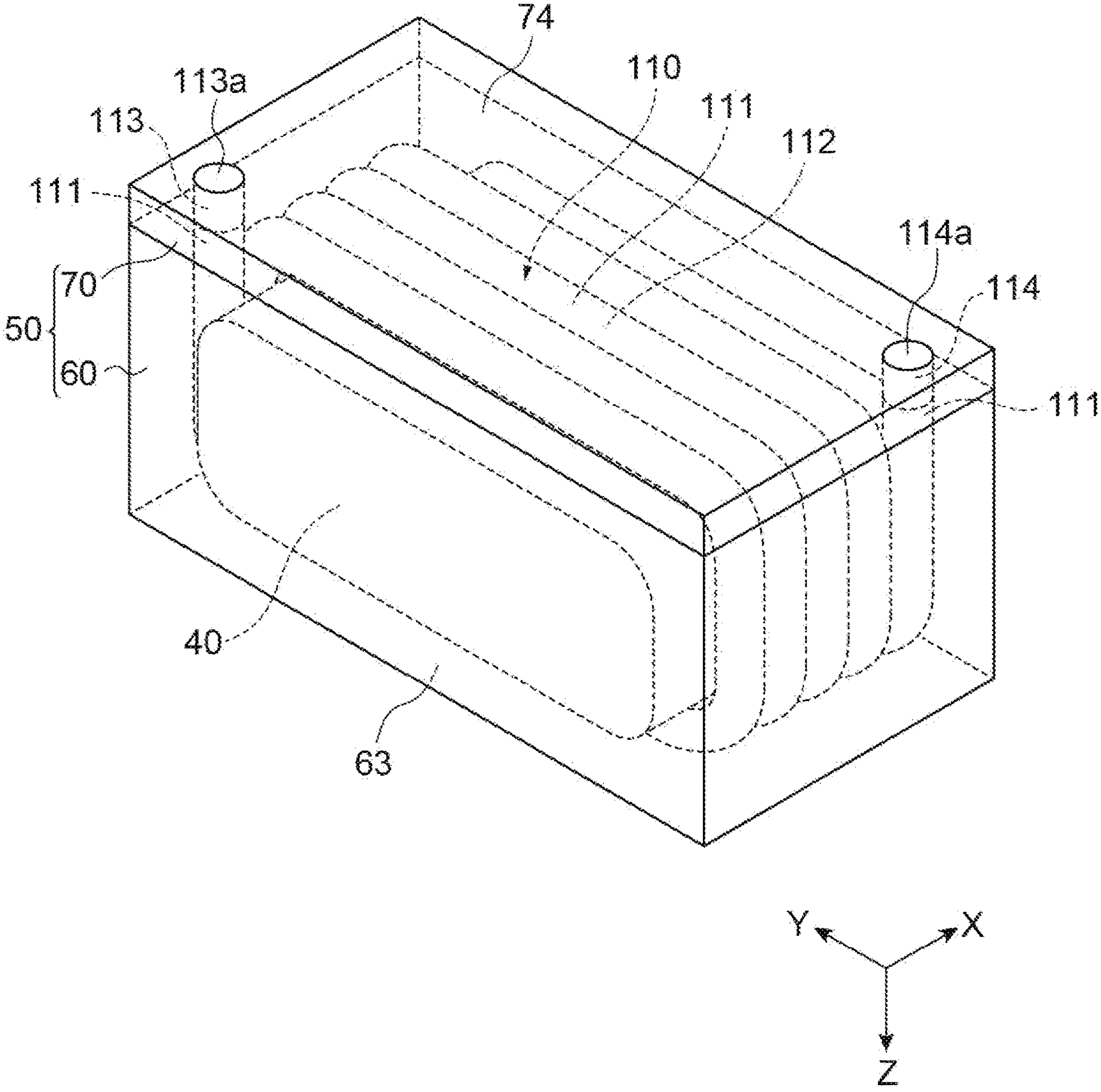
FIG. 16 is a diagram illustrating the making process of the coil component according to the second embodiment.

An example of a method for making the coil component 2 according to the present embodiment will be described with reference to FIGS. 14 to 16. FIG. 14 is a flowchart illustrating a making process of the coil component 2 according to the present embodiment. FIGS. 15 and 16 are diagrams illustrating the making process of the coil component 2 according to the present embodiment.

A part of the making process of the coil component 2 according to the present embodiment is common to the making process of the coil component 1 according to the first embodiment. A process from a step of preparing the coil 110 (step S20) to a step of forming the second portion 70 (step S22) illustrated in FIG. 14 is common to the process from the step of preparing the coil 10 (step S10) to the step of forming the second portion 70 (step S12) illustrated in FIG. 5. The description of the process from step S20 to step S22 will be omitted.

As illustrated in FIG. 15, at a stage at which the process of step S22 is completed, the wire 111 includes surplus portions 116 and 117 continuous with both ends of the coil portion 112. The surplus portions 116 and 117 include portions that will later serve as the connection portions 113 and 114.

Next to the process of step S22, the surplus portions 116 and 117 of the wire 111 are cut (step S23). For example, the surplus portions 116 and 117 of the wire 111 are cut to slightly protrude from the side surface 74 of the second portion 70 to the outside of the exterior body 50.

Next, end surfaces of the cut wire 111 are polished (step S24). As illustrated in FIG. 16, the wire 111 is polished until the end surfaces of the wire 111 are flush with the side surface 74 of the second portion 70. After the polishing process of step S24 is completed, portions of the surplus portions 116 and 117 disposed inside the exterior body 50 function as the connection portions 113 and 114. The end surfaces 113*a* and 114*a* of the connection portions 113 and 114 are exposed on the side surface 74, as illustrated in FIG. 16.

Next, the terminal electrodes 120 and 130 are disposed on the side surface 74 of the second portion 70 (step S25). The coil component 2 on which the terminal electrodes 120 and 130 are disposed is illustrated in FIG. 14. In the first embodiment, the terminal electrodes 20 and 30 are formed through pressing a part of the wire 11. In contrast, in the present embodiment, the terminal electrodes 120 and 130 are prepared as separate components from the wire 111.

In step S25, the terminal electrodes 120 and 130 are disposed to come into contact with the end surfaces 113*a* and 114*a* of the wire 111. Thus, the terminal electrodes 120 and 130 are electrically connected to the coil 110. The step of disposing the terminal electrodes 120 and 130 (step S25) may include a step of fixing the terminal electrodes 120 and 130 to the side surface 74 of the second portion 70 with the adhesive 80. In this way, the making process of the coil component 2 is completed.

Although the embodiments and modifications of the present invention have been described above, the present invention is not necessarily limited to the embodiments and modifications, and the embodiments can be variously changed without departing from the scope of the invention.

Although the second portion 70 described above is in direct contact with the first portion 60, another member may be interposed between the first portion 60 and the second portion 70.

In the making process of the coil component 1 according to the first embodiment described above, the pair of terminal electrodes 20 and 30 are disposed on the side surface 74 of the second portion 70 after the second portion 70 of the exterior body 50 has been formed. In contrast, the second portion 70 may be formed between the coil 10 and the pair of terminal electrodes 20 and 30 that oppose each other after the pair of terminal electrodes 20 and 30 has been disposed to oppose the coil 10.

What is claimed is:

1. A coil component comprising:

an exterior body;

a coil disposed inside the exterior body; and a pair of terminal electrodes electrically connected to the coil and disposed on the exterior body, wherein the exterior body includes a first portion that covers the coil and is made of a resin, and a second portion on which the pair of terminal electrodes are disposed, and the second portion includes a material having a relative permittivity lower than a relative permittivity of the resin and is disposed between the coil and the pair of terminal electrodes.

2. The coil component according to claim 1, wherein the coil includes a wire, the wire includes a first wire portion having a spiral shape, and a pair of second wire portions, each of the pair of second wire portions is continuous with a corresponding terminal electrode of the pair of terminal electrodes, and each of the terminal electrodes has a flat plate shape.

3. The coil component according to claim 2, wherein the second portion includes a flat side surface on which the pair of terminal electrodes are disposed, each of the second wire portions includes an inner portion disposed inside the exterior body, and an outer portion disposed on the exterior body and continuous with the corresponding terminal electrode, and the inner portion extends in a direction intersecting the side surface, and the outer portion extends in a direction along the side surface.

4. The coil component according to claim 2, wherein the wire includes a conductor and a coating layer covering the conductor and having electrical insulation.

5. The coil component according to claim 1, further comprising a core portion disposed inside the coil, wherein the core portion is made of a resin.

6. A method for making a coil component, the method comprising:

preparing a coil;

forming an exterior body to cover the coil; and disposing a pair of terminal electrodes electrically connected to the coil on the exterior body, wherein the forming step comprises forming a first portion covering the coil with a resin, and forming a second portion on which the pair of terminal electrodes are to be disposed with a predetermined material, the disposing step comprises disposing the pair of terminal electrodes on the exterior body such that the second portion is disposed between the coil and the pair of terminal electrodes, and the predetermined material has a relative permittivity lower than a relative permittivity of the resin.

7. The method according to claim 6, wherein, the preparing step comprises preparing the coil made of a wire, and the method further comprises forming the pair of terminal electrodes continuous with the wire through pressing both end portions of the wire before the disposing step.

* * * * *